US012432515B2

(12) United States Patent
Li et al.

(10) Patent No.: US 12,432,515 B2
(45) Date of Patent: Sep. 30, 2025

(54) AUDIO DATA PROCESSING METHOD AND APPARATUS, TERMINAL AND COMPUTER-READABLE STORAGE MEDIUM

(71) Applicant: SHENZHEN TCL DIGITAL TECHNOLOGY LTD., Shenzhen (CN)

(72) Inventors: Chun Li, Shenzhen (CN); Yu Qin, Shenzhen (CN)

(73) Assignee: SHENZHEN TCL DIGITAL TECHNOLOGY LTD., Guangdong (CN)

( * ) Notice: Subject to any disclaimer, the term of this patent is extended or adjusted under 35 U.S.C. 154(b) by 295 days.

(21) Appl. No.: 18/250,529

(22) PCT Filed: Oct. 25, 2021

(86) PCT No.: PCT/CN2021/126215
§ 371 (c)(1),
(2) Date: Apr. 25, 2023

(87) PCT Pub. No.: WO2022/089383
PCT Pub. Date: May 5, 2022

(65) Prior Publication Data

US 2023/0403526 A1 Dec. 14, 2023

(30) Foreign Application Priority Data

Oct. 26, 2020 (CN) ......................... 202011155685.9

(51) Int. Cl.
*H04S 7/00* (2006.01)
*H04S 3/00* (2006.01)

(52) U.S. Cl.
CPC .............. *H04S 7/302* (2013.01); *H04S 3/008* (2013.01); *H04S 2400/01* (2013.01);
(Continued)

(58) Field of Classification Search
None
See application file for complete search history.

(56) References Cited

U.S. PATENT DOCUMENTS 10,728,690 B1 * 7/2020 Satongar ................. H04S 3/008
2005/0271212 A1 * 12/2005 Schaeffer .................. H04S 7/30
381/17

(Continued)

FOREIGN PATENT DOCUMENTS

CN 1284195 A 2/2001
CN 108632714 A 10/2018

(Continued)

OTHER PUBLICATIONS

International Search Report in International application No. PCT/CN2021/126215, mailed on Jan. 14, 2022.

(Continued)

*Primary Examiner* — Qin Zhu
(74) *Attorney, Agent, or Firm* — PV IP PC; Wei Te Chung

(57) ABSTRACT

An audio data processing method, an audio data processing apparatus, a terminal, and a computer-readable storage medium are disclosed. In the embodiments of the present invention, a multi-channel audio is processed into left and right channel audio, and the users can experience the effect of surround sound when listening to a target audio.

14 Claims, 3 Drawing Sheets

(52) U.S. Cl.
CPC ....... *H04S 2400/03* (2013.01); *H04S 2400/11* (2013.01); *H04S 2420/01* (2013.01)

(56) References Cited

U.S. PATENT DOCUMENTS

| | | | | |
|---|---|---|---|---|
| 2016/0183027 A1 | | 6/2016 | Morrow | |
| 2016/0255453 A1 | * | 9/2016 | Fueg | G10K 15/12 381/1 |
| 2021/0176583 A1 | * | 6/2021 | Kearney | H04S 7/302 |
| 2022/0286781 A1 | * | 9/2022 | Yan | H04R 5/04 |

FOREIGN PATENT DOCUMENTS

| | | | | | |
|---|---|---|---|---|---|
| CN | 111246345 A | * | 6/2020 | | H04L 67/06 |
| CN | 113747335 A | * | 12/2021 | | G10L 19/008 |
| DE | 102019128856 A1 | * | 5/2020 | | G06F 3/165 |
| JP | 2015126359 A | | 7/2015 | | |

OTHER PUBLICATIONS

Written Opinion of the International Search Authority in International application No. PCT/CN2021/126215, mailed on Jan. 14, 2022.

* cited by examiner

AUDIO DATA PROCESSING METHOD AND APPARATUS, TERMINAL AND COMPUTER-READABLE STORAGE MEDIUM

This application is a US national phase application based upon an International Application No. PCT/CN2021/126215, filed on Oct. 25, 2021, which claims the priority of Chinese Patent Application No. 202011155685.9, entitled "AUDIO DATA PROCESSING METHOD AND APPARATUS, TERMINAL AND COMPUTER-READABLE STORAGE MEDIUM", filed on Oct. 26, 2020, the disclosure of which is incorporated herein by reference in its entirety.

FIELD OF THE DISCLOSURE

The present disclosure relates to an audio data processing technology, and more particularly, to an audio data processing method, a related device, a terminal and a computer-readable storage medium.

BACKGROUND

Multi-channel audio data, such as Dolby 5.1 channels, needs to be equipped with a corresponding number of speakers to achieve surrounding stereoscopic sound effects. However, most of the commonly-used equipments for watching video or listening to music, such as TVs and mobile phones, have only two speakers. That is, they only support two channels—left and right channels. In this way, even if the source is multi-channel audio data, they cannot achieve surrounding stereoscopic sound effects.

Therefore, the conventional art needs to be improved.

SUMMARY

Technical Problem

One objective of an embodiment of the present disclosure is to provide an audio data processing method, a related device, a terminal and a computer-readable storage medium, in order to solve the issue that the device supports only two channels and thus cannot surrounding stereoscopic sound effects.

Technical Solution

In a first aspect, according to an embodiment of the present disclosure, an audio data processing method is disclosed.

The method comprises: obtaining a frame to be processed in a first audio, and obtaining a position angle corresponding to each channel in the frame to be processed according to a preset correspondence relationship between channels and position angles;

obtaining the head-related transfer function corresponding to each channel in the frame to be processed according to the position angle corresponding to each channel in the frame to be processed; wherein the head-related transfer function corresponding to each channel includes a left ear related head-related transfer function and a right ear head-related transfer function;

performing a convolution on audio data corresponding to each channel in the frame to be processed with the left ear related transfer function to obtain a left channel data, and performing a convolution on the audio data corresponding to each channel in the frame to be processed with the right ear related transfer function to obtain a right channel data;

performing a superimposition on the left channel data and the right channel data to obtain a target frame of the target audio.

In a second aspect, according to another embodiment of the present disclosure, an audio data processing device is disclosed. The audio data processing device includes:

a first obtaining module, configured to obtain a frame to be processed in a first audio, and obtain a position angle corresponding to each channel in the frame to be processed according to a preset correspondence relationship between channels and position angles;

a second obtaining module, configured to obtain the head-related transfer function corresponding to each channel in the frame to be processed according to the position angle corresponding to each channel in the frame to be processed, wherein the head-related transfer function corresponding to each channel includes a left ear related head-related transfer function and a right ear head-related transfer function;

a convolution module, configured to perform a convolution on audio data corresponding to each channel in the frame to be processed with the left ear related transfer function to obtain a left channel data, and perform a convolution on the audio data corresponding to each channel in the frame to be processed with the right ear related transfer function to obtain a right channel data;

a superimposing module, configured to perform a superimposition on the left channel data and the right channel data to obtain a target frame of the target audio.

In a third aspect, according to another embodiment of the present disclosure, a terminal is disclosed. The terminal comprises a memory and a processor. The memory is configured to store an audio data processing program. The processor is configured to execute the audio data processing program to perform the aforementioned audio data processing method.

In a fourth aspect, according to another embodiment of the present disclosure, a computer-readable storage medium is disclosed. The computer-readable storage medium stores an audio data processing program, wherein the audio data processing program is executed by a processor to perform the aforementioned audio data processing method.

Advantageous Effect

In contrast to the conventional art, the present disclosure provides an audio data processing method, a terminal and a storage medium. The audio data processing method presets the correspondence relationship between each channel and the position angle, determine the position angle corresponding to each channel in the first audio frame to be processed, and obtain the left and right ear head-related transfer functions of each channel in the frame to be processed according to the position angle. Here, the head-related transfer function is a sound positioning algorithm. The related transfer functions of the left and right ears of each channel are convolved with the audio data of the channel respectively to obtain the left channel data and the right channel data. Then, the left channel data and the right channel data are combined to obtain the target frame of the target audio. In this way, the multi-channel first audio is processed as the target audio of the left and right channels, and the user can experience the effect of surrounding sound when listening to the target audio through the two-channel playback device.

DETAILED DESCRIPTION OF PREFERRED EMBODIMENTS

In order to make the object, technical solution and effect of the present invention more clear and definite, the present invention will be further described in detail below with reference to the accompanying drawings and examples. It should be understood that the specific embodiments described here are only used to explain the present invention, not to limit the present invention.

The present disclosure provides an audio data processing method, which can be applied in the terminal. The terminal is capable of executing the audio data processing method provided by the present disclosure to process the audio data generated by its own playback to a target sound effect.

Embodiment 1

Figure 1:
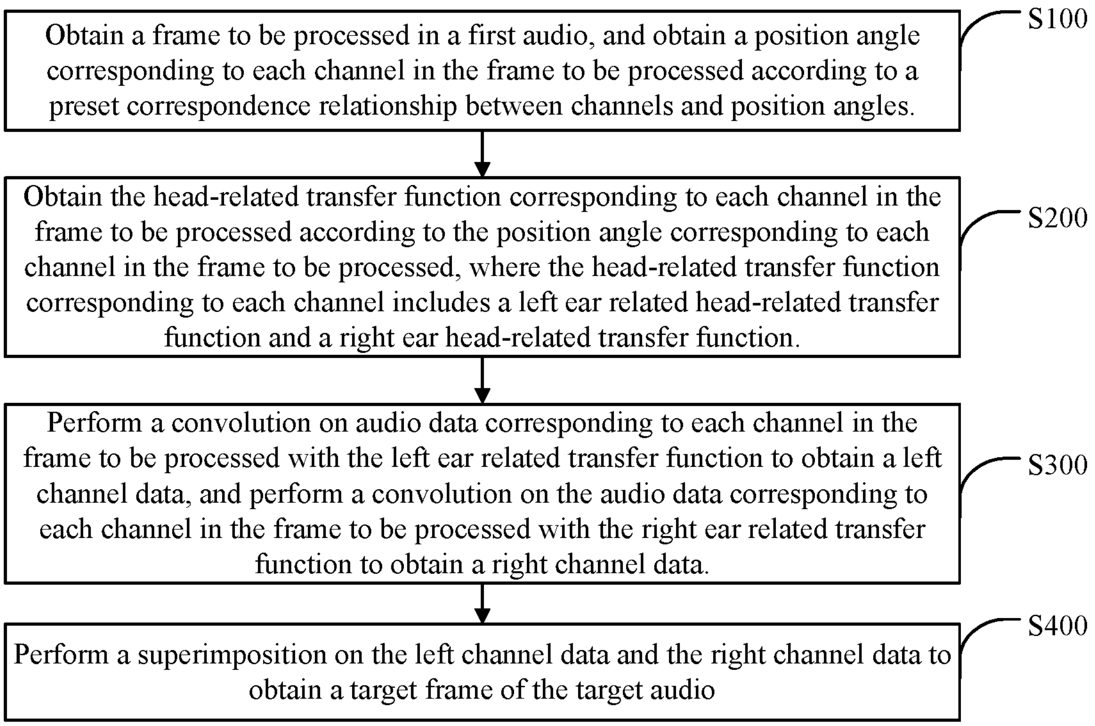
FIG. 1 is a flow chart an audio data processing method according to an embodiment of the present disclosure.

Please refer to FIG. 1. FIG. 1 is a flow chart an audio data processing method according to an embodiment of the present disclosure. The audio data processing method comprises following steps:

S100: obtaining the frame to be processed in the first audio, and obtaining the position angle corresponding to each channel in the frame to be processed according to the preset correspondence relationship between channels and position angles.

The first audio is the audio to be processed. In this embodiment, the first audio is processed to obtain a two-channel target audio. Specifically, when the terminal plays the first audio, the first audio is transmitted to the speakers or the headphones, peripheral speakers and other playback devices through an external port, Bluetooth, etc. for playback. In the present disclosure, before the first audio is transmitted to the playback device, the first audio is processed to obtain the target audio and then transmitted to the playback device.

The first audio consists of a plurality of frames. In this embodiment, the first audio is processed in a unit of frames. For the frame to be processed in the first audio, the audio data of each channel included in the frame to be processed is extracted and stored separately. As shown in Table 1, taking the Dolby 5.1 channel as an example. Dolby 5.1 includes 6 channels, the front left channel, the front right channel, the center channel, the subwoofer channel, the rear left surrounding channel and the rear right surrounding channel. The audio data of each channel is extracted and stored according to the names in Table 1. Please note, these names are only examples, not a limitation of the present disclosure.

TABLE 1

| name | meaning |
|---|---|
| in_buffer_channel_left | Front left channel |
| in_buffer_channel_right | Front right channel |
| in_buffer_channel_center | Center channel |
| in_buffer_channel_subwoofer | Bass heavy channel |
| in_buffer_channel_leftsurround | Rear left surround channel |
| in_buffer_channel_rightsurround | Rear right surround channel |

Figure 2:
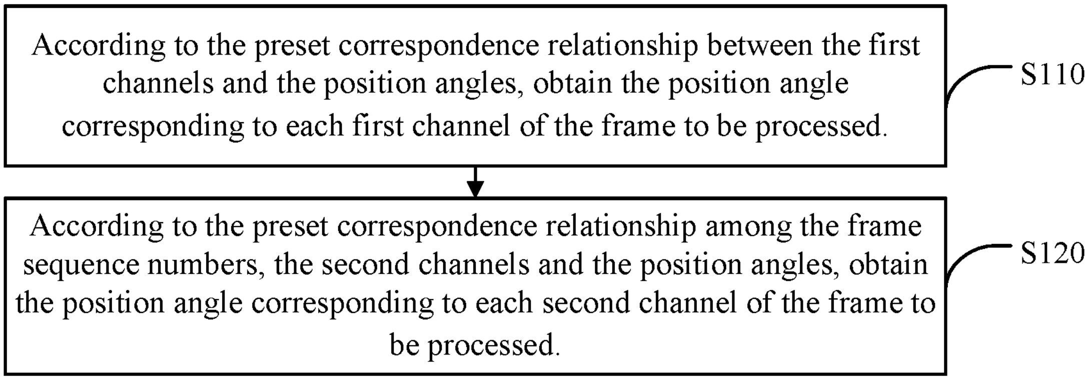
FIG. 2 is a flow chart of sub-steps of step S100 of the audio data processing method according to an embodiment of the present disclosure.

After identifying each channel in the frame to be processed, the corresponding position angle of each channel in the frame to be processed is obtained according to the preset correspondence relationship between the channels and the position angles as shown in FIG. 2. Please refer to FIG. 2. FIG. 2 is a flow chart of sub-steps of step S100 of the audio data processing method according to an embodiment of the present disclosure. The S100 comprises:

S110: according to the preset correspondence relationship between the first channels and the position angles, obtaining the position angle corresponding to each first channel of the frame to be processed.

S120: according to the preset correspondence relationship among the frame sequence numbers, the second channels and the position angles, obtaining the position angle corresponding to each second channel of the frame to be processed.

In this embodiment, the position angle comprises an azimuth and an elevation angle. Each position angle corresponds to an azimuth on the horizontal plane of the center of the head. The specific division/definition of the azimuth and the elevation angle is well known in the field of sound processing and thus omitted here. In one embodiment, each channel is set to a corresponding fixed position angle. That is, each channel has a corresponding position angle, as shown in Table 2.

TABLE 2

| name | Azimuths | Elevations |
|---|---|---|
| in_buffer_channel_left | −45 | 0 |
| in_buffer_channel_right | 45 | 0 |
| in_buffer_channel_center | 0 | 0 |
| in_buffer_channel_subwoofer | 0 | −45 |
| in_buffer_channel_leftsurround | −80 | 0 |
| in_buffer_channel_rightsurround | 80 | 0 |

In order to improve the stereoscopic sound effect, some channels are selected for special processing, so that these channels could correspond to different position angles in different frames. In this way, when the processed audio is continuously played frame by frame, the listener can feel that the sound of these channels is transmitted from different directions at different moments (that is, the effect that the source of the sound is moving).

The second channel can be any one or more channels in the frame to be processed. The first channel is the channel other than the second channel in the frame to be processed. Taking the Dolby 5.1 channel as an example, the front left channel could be selected as the second channel and the other channels can be selected as the first channel. Or, the rear left surrounding channel and the rear right surrounding channel can be selected as the second channel and the other channels are selected as the first channel, etc.

Each first channel corresponds to a position angle and the correspondence relationship can be preset. As shown in Table 2, the position angle corresponding to the front left channel is set as azimuth −45°, elevation angle 0°, the position angle corresponding to the central channel is set as azimuth 0°, elevation angle 0°, etc. For the second channel, the corresponding position angles in different frames are different. In this embodiment, the correspondence relationship among the frame sequence numbers, the second channels and the position angles could be preset. Specifically, before the step of obtaining the position angle corresponding to each second channel of the frame to be processed according to the preset correspondence relationship among the frame sequence numbers, the second channels and the position angles, the method further comprises following steps:

S0: establishing the correspondence between the frame sequence number, the second channels and the position angles according to a preset parameter.

The preset parameter is a time duration. Specifically, the correspondence relationship among the frame sequence numbers, the second channels and the position angles can allow the corresponding sound of the second channel to make the listener feel the effect that sound source is moving. The preset parameter determines the period of sound source movement. Specifically, the step of establishing the preset correspondence relationship among the frame serial numbers, the second channels and the position angles according to the preset parameter comprises:

S01: determining the number of frames included in each frame group in the first audio according to the preset parameter.

S02: For the target second channel, corresponding each position angle in the preset position angle set to the frame in a single frame group according to the preset rules and establishing the correspondence relationship among the frame sequence numbers, the second channels and the position angles.

In this embodiment, the first audio is divided into multiple frame groups. Each frame group includes consecutive N frames, where N is an integer greater than 1. The number of frames included in each frame group may be preset. Specifically, the step of determining the number of frames included in each frame group according to the preset parameter comprises:

S011: obtaining the frame rate of the first audio.

S012: determining the number of frames included in the time duration corresponding to the preset parameter according to the frame rate.

S013: Setting the number of frames included in each frame group in the first audio be equal to the number of frames included in the time duration corresponding to the preset parameter.

In each frame group, the sound corresponding to the second channel allows the listener to feel the effect that the sound source is moving. The number of frames included in each frame group can determine the movement period of the sound source. For example, each frame group includes 3 frames, and the corresponding position angles the target second channel of each frame are left front, middle, and right front directions. Accordingly, when the processed audio is played, the target second channel sound will make the listener feel that the sound source is moving periodically, the period is the time duration of each frame group, and the sound source in each period moves sequentially from the left front, middle, to the front right. It could be understood that the preset parameter can determine the time duration of the moving period of the sound source, and the preset parameter value can be set according to different sound effect requirements, such as 10 s, 5 s, etc.

The position angle set could be preset. The position angle set includes a plurality of position angles. For example, the position angles in the position angle set can be those shown in Table 3. Here, the former value in each column in Table 3 is azimuth, and the latter value is elevation angle.

TABLE 3

| | | | | |
|---|---|---|---|---|
| −80, 0 | −65, 0 | −55, 0 | −45, 0 | −40, 0 |
| −35, 0 | −30, 0 | −25, 0 | −20, 0 | −15, 0 |
| −10, 0 | −5, 0 | 0, 0 | 5, 0 | 10, 0 |
| 15, 0 | 20, 0 | 25, 0 | 30, 0 | 35, 0 |
| 40, 0 | 45, 0 | 55, 0 | 65, 0 | 80, 0 |
| 80, 180 | 65, 180 | 55, 180 | 45, 180 | 40, 180 |
| 35, 180 | 30, 180 | 25, 180 | 20, 180 | 15, 180 |
| 10, 180 | 5, 180 | 0, 180 | −5, 180 | −10, 180 |
| −15, 180 | −20, 180 | −25, 180 | −30, 180 | −35, 180 |
| −40, 180 | −45, 180 | −55, 180 | −65, 180 | −80, 180 |

Here, the preset position angle is corresponded to each frame in a single frame group. Each position angle corresponds to at least one frame in a single frame group. For example, a frame group includes 40 frames, and there are 20 preset position angles. In this case, every two frames could correspond to one position angle, and different second channels in each frame could correspond to different position angles. Taking the left surrounding channel and the right surrounding channel as an example, it could be that in the first two frames in a frame group, the left surrounding channel corresponds to the position angle (azimuth −5, elevation angle 0), and the right surrounding channel corresponds to the position angle (azimuth 5, elevation angle 0). According to the frame sequence number n of the frame, it can be determined that the frame is the $n^{th}$ frame in a single frame group. Therefore, by using each second channel as the target second to correspond the position angles to the frames in the frame group, the correspondence relationship among the frame sequence numbers, the position angles and the frames in a single frame group could be established.

Figure 3:
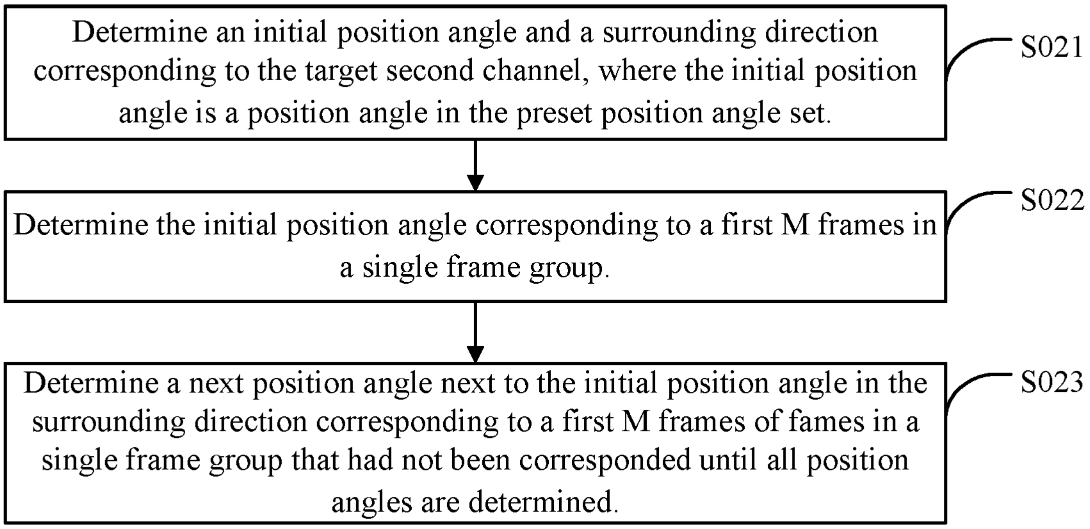
FIG. 3 is a flow chart of the sub-steps of step S02 of the audio data processing method according to an embodiment of the present disclosure.

In order to make the sound corresponding to the second channel produce a sound effect of circling the listener's head in each period. As shown in FIG. 3, the step of corresponding to each in the preset position angle set to the frames in a single frame group according to the preset rule comprises following steps:

S021: determining an initial position angle and a surrounding direction corresponding to the target second channel; wherein the initial position angle is a position angle in the preset position angle set.

S022: determining the initial position angle corresponding to a first M frames in a single frame group.

S023: determining a next position angle next to the initial position angle in the surrounding direction corresponding to a first M frames of frames in a single frame group that had not been corresponded until all position angles are determined.

In order to make the sound corresponding to the second channel can produce the effect of circling the listener's head in each period (that is, in each period, the listener feels that the sound source corresponding to the second channel moves around the head clockwise or counterclockwise), for different second channels, different surrounding directions could be set. Specifically, for the target second channel, an initial position angle is firstly set. That is, in the first frame of each frame group, the listener feels that the sound source corresponding to the target second channel is in the orientation of the initial position angle. Then, surround direction is set, such as clockwise or counterclockwise. Furthermore, the initial position angle is corresponded to the first M frames in a single frame group, and then the next position angle next to the initial position angle in the surrounding direction is corresponded to the first M frames in the remaining frames, and so on until the correspondence is complete, for example, all the position angles are corresponded. Here, M is an integer greater than 1. It can be understood that the M can be the same or different in each correspondence. For example, the first position angle could correspond to 3 frames but the second position angle could correspond to 5 frames.

Please refer to FIG. 1 again. The audio data processing method further comprises following steps:

S200: according to the position angle of each channel in the frame to be processed, obtaining the head-related transfer function corresponding to each channel in the frame to be processed.

The head-related transfer functions corresponding to each channel include the left ear head-related transfer function and the right ear head-related transfer function. Specifically, the head-related transfer function (HRTF) is a sound effect positioning algorithm, which can produce stereo sound effects, so that when the sound is transmitted to the pinna, ear canal and periosteum in the human ear, the listener will feel the stereo sound effect. When the head-related transfer functions at different position angles are selected to process the audio data, the processed audio data can make the listener can feel the effect that the sound is coming in the direction of the corresponding position angle.

In this embodiment, the head-related transfer function corresponding to each channel is obtained according to the pre-set head-related transfer function library, and the head-related transfer function library stores the head-related transfer function corresponding to each position angle.

Specifically, the head-related transfer function corresponding to each channel in the frame to be processed is obtained according to the position angle corresponding to each channel in the frame to be processed. This step comprises:

S210: identifying the target race of the target audio.

S220: determining the corresponding head-related transfer function library according to the target race.

S230: according to the position angle corresponding to each channel in the frame to be processed, obtaining the head-related transfer function corresponding to each channel in the frame to be processed from the head-related transfer function library.

There are differences in the head shape of people of different races (Chinese, European and American Caucasians, etc.). In this embodiment, the head-related transfer function library of different races is established in advance. In the application, the target race of the target audio is first determined. That is, what race of the person listening to the target audio obtained after processing the first audio can be determined by receiving the information input by the user or according to the address location of the terminal. After determining the head-related transfer function library, the head-related transfer function of the position angle corresponding to each channel in the frame to be processed from the head-related transfer function library. For example, the head-related transfer function corresponding to each channel can be those shown in Table 4 (HRIR in Table 4 is the time domain representation of HRTF).

TABLE 4

| name | azimuth | elevation | HRIR(left) | HRIR(right) |
|---|---|---|---|---|
| in_buffer_channel_left | −45 | 0 | fir_l_l | fir_l_r |
| in_buffer_channel_right | 45 | 0 | fir_r_l | fir_r_r |
| in_buffer_channel_center | 0 | 0 | fir_c_l | fir_c_r |
| in_buffer_channel_subwoofer | 0 | −45 | fir_s_l | fir_s_r |
| in_buffer_channel_leftsurrond | −80 | 0 | fir_ls_l | fir_ls_r |
| in_buffer_channel_rightsurrond | 80 | 0 | fir_rs_l | fir_rs_r |

Specifically, the data in the preset header-related transfer function library may be obtained from an existing database. For example, the data in the header-related transfer function library in this embodiment may be obtained from the CIPIC database. The CIPIC HRTF database is an open database with high spatial resolution, which contains 45 real human measurement data. KEMAR artificial head has two sets of measurement data of a small pinna and a large pinna. It uses the binaural polar coordinate system to show the sound source position. In addition, the sound source position is measured at 1 m away from the center of the participant's head. The library has 2500 measured HRIR data for each participant, The HRIR data is a set having binaural HRIRs in 1250 different spatial locations, consisting of 25 different horizontal directions and 50 different vertical directions in the binaural polar coordinate system and measurements on the KEMAR horizontal and positive planes in a vertical polar coordinate system. In this embodiment, the measurement data for the position angle on the KEMAR horizontal plane in the vertical polar coordinate system are selected.

Please refer to FIG. 1 again. After obtaining the head-related transfer function corresponding to each channel, the audio data processing method further comprises following steps:

S300: performing a convolution on audio data corresponding to each channel in the frame to be processed with the left ear related transfer function to obtain a left channel data, and performing a convolution on the audio data corresponding to each channel in the frame to be processed with the right ear related transfer function to obtain a right channel data.

The head-related transfer function is a filter. The audio data of the corresponding channel is added to the filtering processing of spatial orientation sense. That is, the audio data of the corresponding channel is convolved with the corresponding left and right ear head-related transfer functions. The audio data of each channel and the corresponding left ear head-related transfer function are convolved to obtain the data of the left ear channel, and the audio data of each channel is convolved with the corresponding right ear head-related transfer function to obtain the data of the right ear channel. The specific calculation process can be expressed by the following formula:

out_buffer_channel_left=in_buffer_channel_left*$fir\_l\_l$+ in_buffer_channel_right*$fir\_r\_l$+ in_buffer_channel_center*$fir\_c\_l$+ in_buffer_channel_subwoofer*$fir\_s\_l$+ in_buffer_channel_leftsurrond*$fir\_ls\_l$+ in_buffer_channel_rightsurrond*$fir\_rs\_l$ In the above formula, out_buffer_channel_left represents the left ear channel data and * represents convolution. Similarly, one having ordinary skills in the art could understand and use a similar formula to get the right ear channel data.

S400: performing a superimposition on the left channel data and the right channel data to obtain a target frame of the target audio.

Through the above steps, the left channel data and right channel data corresponding to the frame to be processed can be obtained. Then, the left channel data and the right channel data can be superimposed as the target frame of the target audio. After each frame of the first audio is processed as the frame to be processed, the first audio is processed as the target audio.

The frame to be processed in the first audio can be processed in real time to obtain the target frame and transmitted to the playback device in real time. That is, the frame(s) can be transmitted in a form of a data stream. Or, the complete target audio can be obtained after all the frames in the first audio are processed.

To sum up, the present invention provides an audio data processing method. The audio data processing method presets the correspondence relationship between each channel and the position angle, determine the position angle corresponding to each channel in the first audio frame to be processed, and obtain the left and right ear head-related transfer functions of each channel in the frame to be processed according to the position angle. Here, the head-related transfer function is a sound positioning algorithm. The related transfer functions of the left and right ears of each channel are convolved with the audio data of the channel respectively to obtain the left channel data and the right channel data. Then, the left channel data and the right channel data are combined to obtain the target frame of the target audio. In this way, the multi-channel first audio is processed as the target audio of the left and right channels, and the user can experience the effect of surrounding sound when listening to the target audio through the two-channel playback device.

Although the various steps in the flow ch arts given in the accompanying drawings of the present specification are displayed sequentially according to the arrows, these steps are not necessarily executed sequentially in the order indicated by the arrows. Unless otherwise specified herein, there is no strict order restriction on the execution of these steps, and these steps can be executed in other orders. Moreover, at least a part of the steps in the flowchart may include multiple sub-steps or multiple stages, and these sub-steps or stages are not necessarily executed at the same time, but may be executed at different times. The execution order of these sub-steps or stages is not necessarily performed sequentially, but may be executed alternately or alternately with at least a part of other steps or sub-steps or stages of other steps.

Those of ordinary skill in the art can understand that all or part of the processes in the methods of the above embodiments can be implemented through computer programs to instruct related hardware. The computer programs can be stored in a non-volatile computer-readable storage medium. When the computer program is executed, it may include the procedures of the embodiments of the above-mentioned methods. Any reference to memory, storage, database or other media used in the various embodiments provided herein may include non-volatile and/or volatile memory. Non-volatile memory can include read only memory (ROM), programmable ROM (PROM), electrically programmable ROM (EPROM), electrically erasable programmable ROM (EEPROM), or flash memory. Volatile memory can include random access memory (RAM) or external cache memory. RAM is available in many forms such as Static RAM (SRAM), Dynamic RAM (DRAM), Synchronous DRAM (SDRAM), Double Data Rate SDRAM (DDRSDRAM), Enhanced SDRAM (ESDRAM), Synchronous Link (Synchlink) DRAM (SLDRAM), memory bus (Rambus) direct a RAM (RDRAM), direct memory bus dynamic RAM (DRDRAM), and memory bus dynamic RAM (RDRAM), etc.

Embodiment 2

Figure 4:
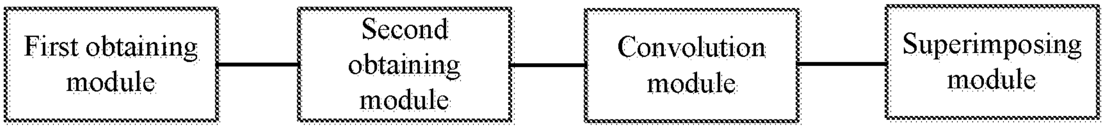
FIG. 4 is a functional block diagram of an audio data processing device according to an embodiment of the present disclosure.

FIG. 4 is a functional block diagram of an audio data processing device according to an embodiment of the present disclosure. Based on the above embodiments, the present disclosure further provides an audio data processing device. The audio data processing device comprises: a first obtaining module, a second obtaining module, a convolution module and a superimposing module.

The first obtaining module is used for obtaining a frame to be processed in a first audio, and obtaining a position angle corresponding to each channel in the frame to be processed according to a preset correspondence relationship between channels and position angles.

The second obtaining module is used for obtaining the head-related transfer function corresponding to each channel in the frame to be processed according to the position angle corresponding to each channel in the frame to be processed. Here, the head-related transfer function corresponding to each channel includes a left ear related head-related transfer function and a right ear head-related transfer function.

The convolution module is used to performing a convolution on audio data corresponding to each channel in the frame to be processed with the left ear related transfer function to obtain a left channel data, and performing a convolution on the audio data corresponding to each channel in the frame to be processed with the right ear related transfer function to obtain a right channel data.

The superimposing module is used for performing a superimposition on the left channel data and the right channel data to obtain a target frame of the target audio.

Embodiment 3

Figure 5:
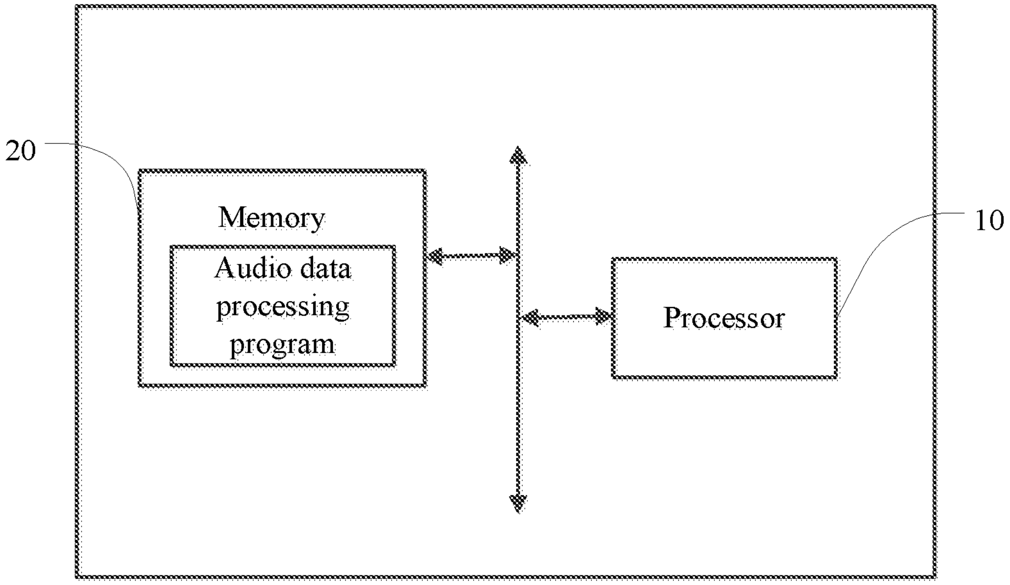
FIG. 5 is a functional block diagram of a terminal according to an embodiment of the present disclosure.

Please refer to FIG. 5. FIG. 5 is a functional block diagram of a terminal according to an embodiment of the present disclosure. Based on the above embodiments, the present disclosure further provides a terminal. The terminal comprises a memory 10 and a processor 20. The memory 10 is used to store an audio data processing program. The processor 20 is used to execute the audio data processing program to perform operations comprising:

obtaining a frame to be processed in a first audio, and obtaining a position angle corresponding to each channel in the frame to be processed according to a preset correspondence relationship between channels and position angles;

obtaining the head-related transfer function corresponding to each channel in the frame to be processed according to the position angle corresponding to each channel in the frame to be processed; wherein the head-related transfer function corresponding to each channel includes a left ear related head-related transfer function and a right ear head-related transfer function;

performing a convolution on audio data corresponding to each channel in the frame to be processed with the left ear related transfer function to obtain a left channel data, and performing a convolution on the audio data corresponding to each channel in the frame to be processed with the right ear related transfer function to obtain a right channel data; and performing a superimposition on the left channel data and the right channel data to obtain a target frame of the target audio.

The operation of obtaining the position angle corresponding to each channel in the frame to be processed according to the preset correspondence relationship between the channels and the position angles comprises:

according to a preset correspondence relationship between first channels and the position angles, obtaining the position angle corresponding to each first channel of the frame to be processed; and according to a preset correspondence relationship among frame sequence numbers, second channels and the position angles, obtaining the position angle corresponding to each second channel of the frame to be processed.

The first audio comprises a plurality of frame groups, each frame group comprises consecutive N frames, N is an integer greater than 1, and the method comprises a following operation before the operation of obtaining the position angle corresponding to each second channel of the frame to be processed according to the preset correspondence relationship among frame sequence numbers, second channels and the position angles:

establishing the preset correspondence relationship among the frame sequence numbers, the second channels and the position angles based on a preset parameter.

The operation of establishing the preset correspondence relationship among the frame sequence numbers, the second channels and the position angles based on the preset parameter comprises:

determining a number of frames included in each frame group in the first audio according to the preset parameter; and for a target second channel, corresponding each position angle in a preset position angle set to frames in a frame group according to a preset rule to establish preset correspondence relationship the frame sequence numbers, the second channels and the position angles.

Each position angle corresponds to at least one frame in the single frame group.

The operation of determining the number of frames included in each frame group in the first audio according to the preset parameter comprises:

obtaining a frame rate of the first audio;

determine a number of frames included in a duration corresponding to the preset parameter according to the frame rate; and setting the number of frames included in each frame group in the first audio be equal to the number of frames included in the duration corresponding to the preset parameter.

The operation of corresponding each position angle in the preset position angle set to the frames in the frame group according to the preset rule comprises:

determining an initial position angle and a surrounding direction corresponding to the target second channel; wherein the initial position angle is a position angle in the preset position angle set;

determining the initial position angle corresponding to a first M frames in a single frame group; and determining a next position angle next to the initial position angle in the surrounding direction corresponding to a first M frames of frames in a single frame group that had not been corresponded until all position angles are determined;

wherein M is an integer greater than 1.

The operation of obtaining the head-related transfer function corresponding to each channel in the frame to be processed according to the position angle corresponding to each channel in the frame to be processed comprises:

determining a target race of the target audio;

determining a corresponding head-related transfer function library according to the target race;

according to the position angle corresponding to each channel in the frame to be processed, obtaining the head-related transfer function corresponding to each channel in the frame to be processed from the head-related transfer function library.

Embodiment 4

According to an embodiment of the present disclosure. a computer-readable storage medium is disclosed. The computer-readable storage medium stores an audio data processing program. The audio data processing program is executed by a processor to any of the operations in the above-mentioned audio data processing method in Embodiment 1.

Above are embodiments of the present disclosure, which does not limit the scope of the present disclosure. Any modifications, equivalent replacements or improvements within the spirit and principles of the embodiment described above should be covered by the protected scope of the disclosure.

What is claimed is:

1. An audio data processing method, the method comprising:

obtaining a frame to be processed in a first audio, and obtaining a position angle corresponding to each channel in the frame to be processed according to a preset correspondence relationship between channels and position angles;

obtaining a head-related transfer function corresponding to each channel in the frame to be processed according to the position angle corresponding to each channel in the frame to be processed; wherein the head-related transfer function corresponding to each channel includes a left ear related head-related transfer function and a right ear head-related transfer function;

performing a convolution on audio data corresponding to each channel in the frame to be processed with the left ear related transfer function to obtain a left channel data, and performing a convolution on the audio data corresponding to each channel in the frame to be processed with the right ear related transfer function to obtain a right channel data; and performing a superimposition on the left channel data and the right channel data to obtain a target frame of a target audio;

wherein the step of obtaining the position angle corresponding to each channel in the frame to be processed according to the preset correspondence relationship between the channels and the position angles comprises:

according to a preset correspondence relationship between first channels and the position angles, obtaining the position angle corresponding to each first channel of the frame to be processed; and according to a preset correspondence relationship among frame sequence numbers, second channels and the position angles, obtaining the position angle corresponding to each second channel of the frame to be processed;

wherein the first audio comprises a plurality of frame groups, each frame group comprises consecutive N frames, N is an integer greater than 1, and the method comprises a following step before the step of obtaining the position angle corresponding to each second channel of the frame to be processed according to the preset correspondence relationship among frame sequence numbers, second channels and the position angles:

establishing the preset correspondence relationship among the frame sequence numbers, the second channels and the position angles based on a preset parameter.

2. The method of claim 1, wherein the step of establishing the preset correspondence relationship among the frame sequence numbers, the second channels and the position angles based on the preset parameter comprises:

determining a number of frames included in each frame group in the first audio according to the preset parameter; and for a target second channel, corresponding each position angle in a preset position angle set to frames in a frame group according to a preset rule to establish preset correspondence relationship the frame sequence numbers, the second channels and the position angles;

wherein each position angle corresponds to at least one frame in the single frame group.

3. The method of claim 2, wherein the step of determining the number of frames included in each frame group in the first audio according to the preset parameter comprises:

obtaining a frame rate of the first audio;

determine a number of frames included in a duration corresponding to the preset parameter according to the frame rate; and setting the number of frames included in each frame group in the first audio be equal to the number of frames included in the duration corresponding to the preset parameter.

4. The method of claim 2, wherein the step of corresponding each position angle in the preset position angle set to the frames in the frame group according to the preset rule comprises:

determining an initial position angle and a surrounding direction corresponding to the target second channel; wherein the initial position angle is a position angle in the preset position angle set;

determining the initial position angle corresponding to a first M frames in a single frame group; and determining a next position angle next to the initial position angle in the surrounding direction corresponding to a first M frames of frames in a single frame group that had not been corresponded until all position angles are determined;

wherein M is an integer greater than 1.

5. The method of claim 1, wherein the step of obtaining the head-related transfer function corresponding to each channel in the frame to be processed according to the position angle corresponding to each channel in the frame to be processed comprises:

determining a target race of the target audio;

determining a corresponding head-related transfer function library according to the target race;

according to the position angle corresponding to each channel in the frame to be processed, obtaining the head-related transfer function corresponding to each channel in the frame to be processed from the head-related transfer function library.

6. A terminal, comprising:

a memory, configured to store an audio data processing program; and a processor, configured to execute the audio data processing program to perform operations comprising:

obtaining a frame to be processed in a first audio, and obtaining a position angle corresponding to each channel in the frame to be processed according to a preset correspondence relationship between channels and position angles;

obtaining a head-related transfer function corresponding to each channel in the frame to be processed according to the position angle corresponding to each channel in the frame to be processed; wherein the head-related transfer function corresponding to each channel includes a left ear related head-related transfer function and a right ear head-related transfer function;

performing a convolution on audio data corresponding to each channel in the frame to be processed with the left ear related transfer function to obtain a left channel data, and performing a convolution on the audio data corresponding to each channel in the frame to be processed with the right ear related transfer function to obtain a right channel data; and performing a superimposition on the left channel data and the right channel data to obtain a target frame of a target audio;

wherein the operation of obtaining the position angle corresponding to each channel in the frame to be processed according to the preset correspondence relationship between the channels and the position angles comprises:

according to a preset correspondence relationship between first channels and the position angles, obtaining the position angle corresponding to each first channel of the frame to be processed; and according to a preset correspondence relationship among frame sequence numbers, second channels and the position angles, obtaining the position angle corresponding to each second channel of the frame to be processed;

wherein the first audio comprises a plurality of frame groups, each frame group comprises consecutive N frames, N is an integer greater than 1, and the method comprises a following operation before the operation of obtaining the position angle corresponding to each second channel of the frame to be processed according to the preset correspondence relationship among frame sequence numbers, second channels and the position angles:

establishing the preset correspondence relationship among the frame sequence numbers, the second channels and the position angles based on a preset parameter.

7. The terminal of claim 6, wherein the operation of establishing the preset correspondence relationship among the frame sequence numbers, the second channels and the position angles based on the preset parameter comprises:

determining a number of frames included in each frame group in the first audio according to the preset parameter; and for a target second channel, corresponding each position angle in a preset position angle set to frames in a frame group according to a preset rule to establish preset correspondence relationship the frame sequence numbers, the second channels and the position angles;

wherein each position angle corresponds to at least one frame in the single frame group.

8. The terminal of claim 7, wherein the operation of determining the number of frames included in each frame group in the first audio according to the preset parameter comprises:

obtaining a frame rate of the first audio;

determine a number of frames included in a duration corresponding to the preset parameter according to the frame rate; and setting the number of frames included in each frame group in the first audio be equal to the number of frames included in the duration corresponding to the preset parameter.

9. The terminal of claim 7, wherein the operation of corresponding each position angle in the preset position angle set to the frames in the frame group according to the preset rule comprises:

determining an initial position angle and a surrounding direction corresponding to the target second channel; wherein the initial position angle is a position angle in the preset position angle set;

determining the initial position angle corresponding to a first M frames in a single frame group; and determining a next position angle next to the initial position angle in the surrounding direction corresponding to a first M frames of frames in a single frame group that had not been corresponded until all position angles are determined;

wherein M is an integer greater than 1.

10. The terminal of claim 6, wherein the operation of obtaining the head-related transfer function corresponding to each channel in the frame to be processed according to the position angle corresponding to each channel in the frame to be processed comprises:

determining a target race of the target audio;

determining a corresponding head-related transfer function library according to the target race;

according to the position angle corresponding to each channel in the frame to be processed, obtaining the head-related transfer function corresponding to each channel in the frame to be processed from the head-related transfer function library.

11. A computer-readable storage medium storing an audio data processing program, wherein the audio data processing program is executed by a processor to perform operations comprising:

obtaining a frame to be processed in a first audio, and obtaining a position angle corresponding to each channel in the frame to be processed according to a preset correspondence relationship between channels and position angles;

obtaining a head-related transfer function corresponding to each channel in the frame to be processed according to the position angle corresponding to each channel in the frame to be processed; wherein the head-related transfer function corresponding to each channel includes a left ear related head-related transfer function and a right ear head-related transfer function;

performing a convolution on audio data corresponding to each channel in the frame to be processed with the left ear related transfer function to obtain a left channel data, and performing a convolution on the audio data corresponding to each channel in the frame to be processed with the right ear related transfer function to obtain a right channel data; and performing a superimposition on the left channel data and the right channel data to obtain a target frame of a target audio;

wherein the operation of obtaining the position angle corresponding to each channel in the frame to be processed according to the preset correspondence relationship between the channels and the position angles comprises:

according to a preset correspondence relationship between first channels and the position angles, obtaining the position angle corresponding to each first channel of the frame to be processed; and according to a preset correspondence relationship among frame sequence numbers, second channels and the position angles, obtaining the position angle corresponding to each second channel of the frame to be processed;

wherein the first audio comprises a plurality of frame groups, each frame group comprises consecutive N frames, N is an integer greater than 1, and the method comprises a following operation before the operation of obtaining the position angle corresponding to each second channel of the frame to be processed according to the preset correspondence relationship among frame sequence numbers, second channels and the position angles:

establishing the preset correspondence relationship among the frame sequence numbers, the second channels and the position angles based on a preset parameter.

12. The non-transitory computer-readable storage medium of claim 11, wherein the operation of establishing the preset correspondence relationship among the frame sequence numbers, the second channels and the position angles based on the preset parameter comprises:

determining a number of frames included in each frame group in the first audio according to the preset parameter; and for a target second channel, corresponding each position angle in a preset position angle set to frames in a frame group according to a preset rule to establish preset correspondence relationship the frame sequence numbers, the second channels and the position angles;

wherein each position angle corresponds to at least one frame in the single frame group.

13. The non-transitory computer-readable storage medium of claim 12, wherein the operation of determining the number of frames included in each frame group in the first audio according to the preset parameter comprises:

obtaining a frame rate of the first audio;

determine a number of frames included in a duration corresponding to the preset parameter according to the frame rate; and setting the number of frames included in each frame group in the first audio be equal to the number of frames included in the duration corresponding to the preset parameter.

14. The non-transitory computer-readable storage medium of claim 12, wherein the operation of corresponding each position angle in the preset position angle set to the frames in the frame group according to the preset rule comprises:

determining an initial position angle and a surrounding direction corresponding to the target second channel; wherein the initial position angle is a position angle in the preset position angle set;

determining the initial position angle corresponding to a first M frames in a single frame group; and determining a next position angle next to the initial position angle in the surrounding direction corresponding to a first M frames of frames in a single frame group that had not been corresponded until all position angles are determined;

wherein M is an integer greater than 1.

* * * * *